Figure 1:
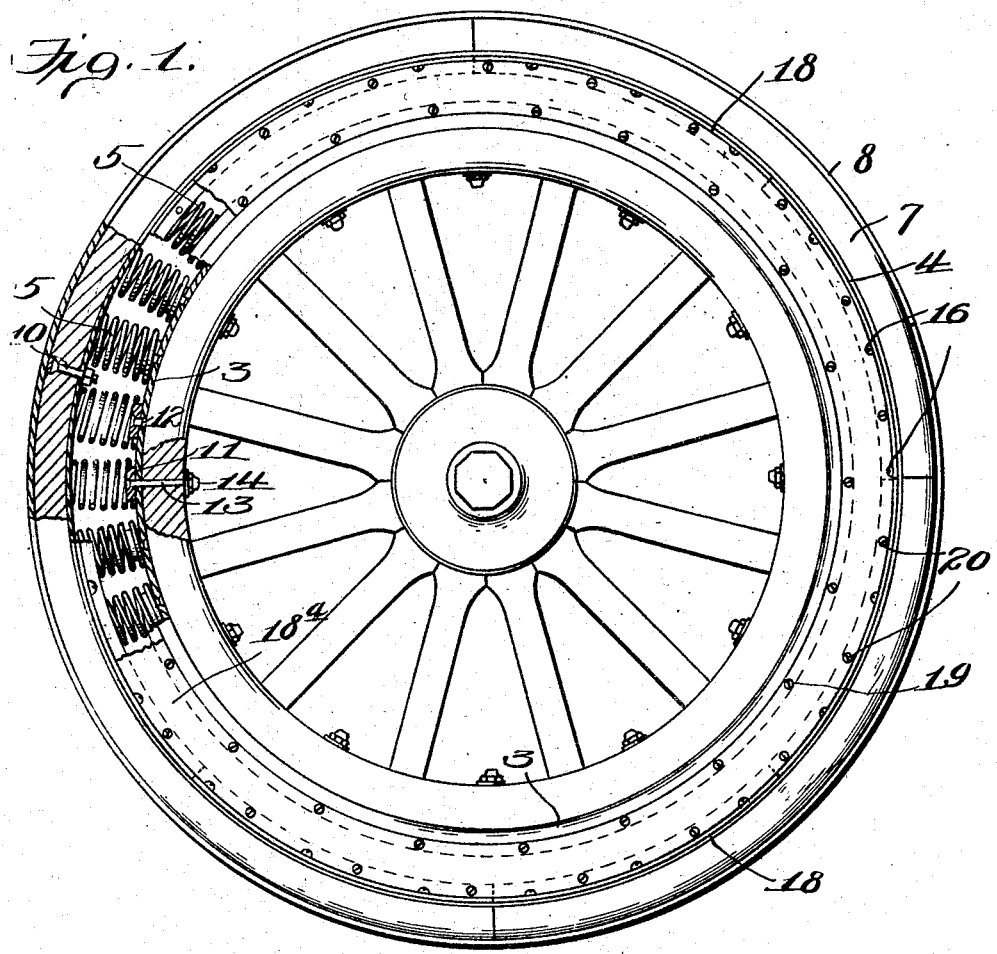

D. MORIARTY.
TIRE.
APPLICATION FILED FEB. 13, 1909.

936,924.

Patented Oct. 12, 1909.

Witnesses:

Inventor
Daniel Moriarty
By
James L. Norris
Atty

UNITED STATES PATENT OFFICE.

DANIEL MORIARTY, OF NEW ORLEANS, LOUISIANA.

TIRE.

936,924.  Specification of Letters Patent.  Patented Oct. 12, 1909.

Application filed February 13, 1909. Serial No. 477,602.

*To all whom it may concern:*

Be it known that I, DANIEL MORIARTY, a citizen of the United States, residing at New Orleans, in the parish of Orleans and State of Louisiana, have invented new and useful Improvements in Tires, of which the following is a specification.

This invention relates to new and useful improvements in spring tires more particularly adapted for use in motor vehicles and belonging to that general type in which two shiftably connected inner and outer rims are employed, the cushioning means being in the nature of springs of suitable or desired construction which are placed between the rims. This general type of construction is well known in the art of spring tires and possesses many advantages, chief among which are the readiness with which the lighter vibration producing shocks incident to travel over rough roads are absorbed, the fact that pneumatic devices with their liability to punctures and blow-outs are absolutely dispensed with, the longevity of the life of such a tire and the general elimination of danger which is incident to a pneumatic tire by reason of skidding or punctures when the vehicle is traveling at a high rate of speed.

The object of the present invention is to provide a tire of the type stated which shall embody a plurality of radially disposed coil springs assembled between inner and outer relatively shiftable rims in a novel manner and combined with removable retaining rings or flanges which are provided at the sides of one of the rims. The springs are confined between the rims in unattached relation, *i. e.*, without the use of positive fastening devices and yet are held positively against lateral displacement by a series of washers or blocks that are secured to the inner rim and are severally disposed in the inner convolutions of the springs without positive attachment thereto. The removable rings or flanges are provided on the outer rim and when such flanges are removed, clearances are afforded at each side of the tire through either of which the spring may be removed simply by a blow with a suitable instrument, it being unnecessary to remove any bolts or other devices except those which are employed to secure the flanges. Inasmuch as the springs in tires of this character occasionally become broken and in time become weak, the advantage of the ready removability thereof is obvious. For the sake of convenience, each removable ring or flange may be made in a plurality of arcuate segments, in order that, in case a particular spring becomes out of order, it may be necessary to remove only the segment adjacent such particular spring and not to remove the ring or flange as an entirety.

The invention while efficiently carrying out the above objects does not sacrifice the necessary incidents of simplicity of structural details, inexpensiveness, strength and efficiency.

A preferred and advantageous embodiment of the invention is illustrated in the accompanying drawings which are to be read in connection with the following description wherein the structural details are set forth at length, while the novel features by which the invention is distinguished from the prior art are recited in language of the proper determinative scope in the claim appended at the end of the specification.

Figure 2:
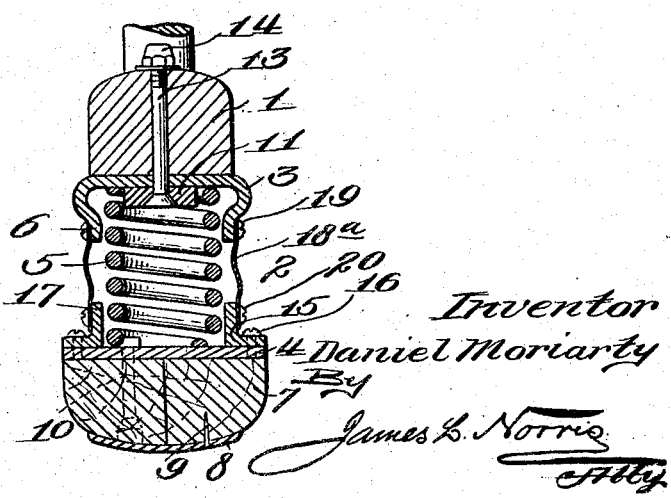

In the said drawings: Figure 1 is a side elevation showing the application of a tire constructed in accordance with the present invention, to the wheel structure of an automobile vehicle, the elevation being in part broken away and in part in section. Fig. 2 is an enlarged cross section of the present tire showing more particularly the manner in which it is connected to the vehicle wheel.

Similar characters of reference refer to corresponding parts throughout the several views.

The felly of the wheel is indicated by the numeral 1 and the tire structure is indicated generally by the numeral 2 and comprises essentially an inner rim 3, an outer rim 4 and springs, as 5, which are interposed between the inner and outer rims. The inner rim 3 is generally similar to the well known clencher rim, differing only therefrom in that it is provided at its sides with extended annular flanges, as 6. The rim 4 carries a tire body, as 7, which is of exceedingly simple and inexpensive construction, being preferably constructed of a surrounding wooden band which is given an ornamental finish and is preferably slightly rounded at its tread portion. Any desired anti-skidding means may be employed in connection with the tire body 7, but in order to satisfy the requirements of inexpensiveness, practicability and safety, I preferably employ a band, as 8, of sole leather, which is held upon the body 7 by pegs, as 9, or other suitable fastening devices.

The body 7 is connected to the rim 4 by bolts, as 10.

The springs 5 may be of any suitable form but are preferably constructed in the form of expansive spirals which are seated upon the rim 3 and which bear frictionally upon the rim 4, the latter being in the form of an annular metallic band. For the purpose of efficiently holding the springs 5 against play or displacement with respect to the rim 3, blocks or washers, as 11, are employed. These washers are engaged within the inner convolution of each spring and in most instances are secured to the rim 3 by rivets 12. Where the washers coincide, however, with the spaces between the spokes of the wheel, bolts 13 are employed to fasten the same, the bolts 13 likewise connecting the rim 3 and the wheel structure and passing through the felly 1. Ornamental nuts of any desired form, as 14, are provided on the projecting inner ends of the bolts 13 and serve to bind the parts. It will thus be seen that the provision of the blocks 11 efficiently prevents any movement or displacement of the springs 5 with respect to the rim 3.

Friction is relied upon to hold the springs against displacement with relation to the rim 4 in the direction of its periphery and for the purpose of holding said springs against lateral displacement with respect to the rim 4, I employ side ring members, as 15. The members 15 are of L-shaped cross section, as shown more particularly in Fig. 2 and are detachably secured to the rim 4 by bolts or other suitable connecting devices, as 16. The rings 15 have inwardly extended flanges, as 17, which lie in the same plane as, or in substantially the same plane as, the flanges 6 aforesaid. The flanges 17 are so arranged as to be closely associated with the springs 5 to hold the latter against lateral displacement. Said flanges, however, do not contact with said springs when the latter have their normal degree of strength and resiliency and in this manner the freedom of relative movement between the rims 3 and 4 is not retarded other than by the necessary action of the springs. The flanges 17 also terminate some distance short of the flanges 6 so as not to abut the same even when there is an unusual degree of relative movement between the rims. It is preferred to make the rings 15 in a plurality of arcuate conterminous segments, as 18, the arrangement of which is shown more particularly in Fig. 1. By so constructing the rings 15, access may be had to any particular spring without removing the ring as an entirety and by simply unloosening a small number of the bolts or screws 16. The relation between the flanges 6 and 17 is of further advantage in that it permits of the use of side covers, as 18ª, by which the springs are concealed from view and by which the tire is prevented from having any unusual appearance. The side covers 18ª may be of any desired flexible material, such as rawhide, leather or waterproof enameled fabric, no particular kind of material being obligatory. Screws 19 and 20 are employed for connecting the side covers 18ª to the respective flanges 6 and 17. In this connection it should be stated that the covers 18ª are not necessary to the efficient use of the device, but add materially to the ornamental appearance of the tire. While it would not retard the action of the tire if dust or other matter should lodge in the space between the rims or upon the various inclosed parts, it is, of course, advantageous for appearance sake that they should be kept as free from dust as possible and the covers 18ª are also of advantage for this purpose.

From the foregoing description it will be apparent that the organization of the parts is such that frictional contact between any of the adjacent elements is avoided, the shifting movement of the rims being retarded only in so far as is necessary by the action of the springs. It may, therefore, be stated that the latter are free to act in absorbing direct and reactionary vibrations. The rings 15 afford an efficient means for positively holding the springs against lateral displacement and at the same time may be readily removed in sections for the purpose of taking out or replacing a particular spring.

As was stated above, the springs 5 are not positively attached to either of the rims but are simply held against displacement, in the one instance by the collars 11 and in the other instance by friction. Therefore, when the desired sections of the rims 15 have been removed, it is only necessary to give the spring which it is desired to take out, a blow with a suitable instrument to dislodge the same and new springs may be readily inserted by jacking the rims away from one another and pressing the springs with a suitable device and then placing them in position between the rims. The device, therefore, efficiently carries out the function for which it is primarily intended, namely, for absorbing shocks, since the freedom of the springs is not interfered with by the arrangement of the other necessary elements. The life of the springs is thus prolonged and wear thereupon reduced. The various parts which are employed are standard articles of manufacture and need no special machinery for their construction and consequently the advantages of inexpensiveness and simplicity are attained. Furthermore, the arrangement permits of the use of an inexpensive tire body with an efficient anti-skidding tread, such as sole leather, which is regarded as best for the purposes of safety and general reliability. The tire also has a neat and highly ornamental appearance, it being understood that all the exposed parts, such as the screws 16, 19 and 20 and the nuts 14 are finished in nickle or brass. It should be stated also that the arrangement permits of using springs of proportionate size and strength to the size of the wheel and the widths of the rims, the springs being of smaller or greater diameter in accordance as they are used upon wheels having fellies of smaller or greater widths.

Having fully described my invention, I claim:

In a spring tire, the combination with inner and outer relatively shiftable rims and removable annular flanges secured at the sides of the outer rim and projecting toward the inner rim but terminating short of the same, of a plurality of coil cushioning springs fitted radially between the rims in unattached relation, and projections provided on the inner rim and fitted within the convolutions of the several springs without positive attachment thereto to maintain the centering of the springs and to hold the same against accidental lateral displacement.

In testimony whereof I have hereunto set my hand in presence of two subscribing witnesses.

DANIEL MORIARTY.

Witnesses:
CHAS. S. HYER,
JOHN S. POWERS.